United States Patent [19]

Omata

[11] Patent Number: 4,602,828
[45] Date of Patent: Jul. 29, 1986

[54] HOUSING DEVICE FOR CONTROL UNIT
[75] Inventor: Nobuaki Omata, Yokohama, Japan
[73] Assignee: Nifco Inc., Yokohama, Japan
[21] Appl. No.: 736,488
[22] Filed: May 20, 1985
[30] Foreign Application Priority Data
May 25, 1984 [JP] Japan .................... 59-75890[U]
[51] Int. Cl.⁴ .................................... A47B 88/00
[52] U.S. Cl. ............................ 312/319; 312/13; 312/15
[58] Field of Search ............... 312/319, 13, 15, 10, 312/237

[56] References Cited
U.S. PATENT DOCUMENTS

| | | | |
|---|---|---|---|
| 3,836,222 | 9/1974 | Kuntz | 312/319 |
| 3,854,784 | 12/1974 | Hunt et al. | 312/319 |
| 4,155,610 | 5/1979 | Englund | 312/319 X |
| 4,427,243 | 1/1984 | Miller | 312/319 X |

*Primary Examiner*—James T. McCall
*Attorney, Agent, or Firm*—Trexler, Bushnell & Wolters, Ltd.

[57] ABSTRACT

A housing device for a remote control unit for a TV set or video cassette recorder has an outer case with an internal space opening to the front for insertion and removal of the control unit and a slide member with means for engaging with the control unit is provided within the outer case so as to be slidable in the inward and outward directions. To the rear of the slide member is provided a crank-shaped equalizer which extends widthwise across the rear of the slide member in abutment therewith and is rotatably supported on the opposite side walls of the outer case. The equalizer is connected with a rotary damper having a stopper mechanism which serves to constantly retain the slide member in the fully retracted position. When the slide member is in the fully retracted position, the control unit engaged with the slide member is retained with its front face substantially flush with the opening at the front of the outer case.

1 Claim, 14 Drawing Figures

HOUSING DEVICE FOR CONTROL UNIT

BACKGROUND OF THE INVENTION

1. Field of the Invention

This invention relates to a housing device for a remote control unit, more particularly to such a housing device built into the main body of a TV set or a video cassette recorder (VCR) and adapted to allow the remote control unit to be stored therein and removed therefrom as desired.

2. Description of the Prior Art

Conventionally, control units of the type that can be housed in or removed from the main body of the TV or VCR they control have been built into the main body in such a way that they can be made to slide out of the main unit by the force of springs upon the operation of an externally located switch, whereafter the control unit can be removed from the main unit and used to control the TV or VCR from a remote location. However, this conventional arrangement has distinct disadvantages that derive from the fact that a plurality of springs are used for causing the control unit to slidingly project from the main unit. More specifically, since the force exerted on the control unit is not uniform among the plurality of springs, the control unit tends not to slide out smoothly. Moreover, when the control unit is to be replaced, it has to be pushed with the same force on the left and right sides of the case thereof or the locking machanism will not operate to hold it in the housed condition. As a result, the feel of the operation sensed by the user is unpleasant. Still another disadvantage of the conventional arrangement is that since the slide mechanism for the control unit and the lock mechanism for securing it in the main body are separate devices, they have to be installed separately and then linked with each other through a complicated connection procedure. What is more, as the lock mechanism is released by the operation of an externally located switch, it is often difficult to find a good location for the switch because of the limited space available.

It is therefore the object of this invention to provide a housing device for a control unit that allows the control unit to be smoothly projected from the main unit simply by a push applied to its front surface and allows the control unit to be smoothly pushed into the main unit and securely locked therein by pushing force applied at any point on the front surface thereof.

SUMMARY OF THE INVENTION

The present invention achieves this object by providing a housing device for a control unit comprising an outer case having an opening at the front face thereof for insertion and removal of the control unit, a slide member which is accommodated within the outer case to be slidable inwardly and outwardly thereof and which releasably retains the control unit when it is inserted into the opening, a crank-shaped equalizer rotatably supported at its opposite ends on the opposite side walls of the outer case so as to abut against the rear of the slide member, and a rotary damper with stopper mechanism connected with one end of the equalizer, the stopper mechanism constantly retaining the slide member in its retracted position.

With this arrangement the equalizer acts uniformly across the full width of the rear face of the slide member. Therefore, when the rotary damper is set into damped rotation by pressing the control unit a slight distance into the outer case and this rotation is conveyed to the equalizer, the equalizer exerts the same force on the right and left sides of the slide member so that the control unit is pushed smoothly out of the outer case by the same distance on both the right and left sides. Then, when the control unit is to be stored again, pressure applied at any point on the front surface thereof will cause its right and left sides to retract equally, this action causing the slide member to retract while rotating the equalizer and the rotary damper connected therewith until the stopper mechanism of the rotary damper becomes securely locked. Moreover, as the entire housing device, not only the outer case thereof, can be assembled into the main unit at one time, there is a major reduction in the number of required assembly operations.

BRIEF DESCRIPTION OF THE DRAWINGS

These and other objects and features of the invention will be clear from the following description made with reference to the attached drawings.

DESCRIPTION OF THE PREFERRED EMBODIMENT

Figure 1:
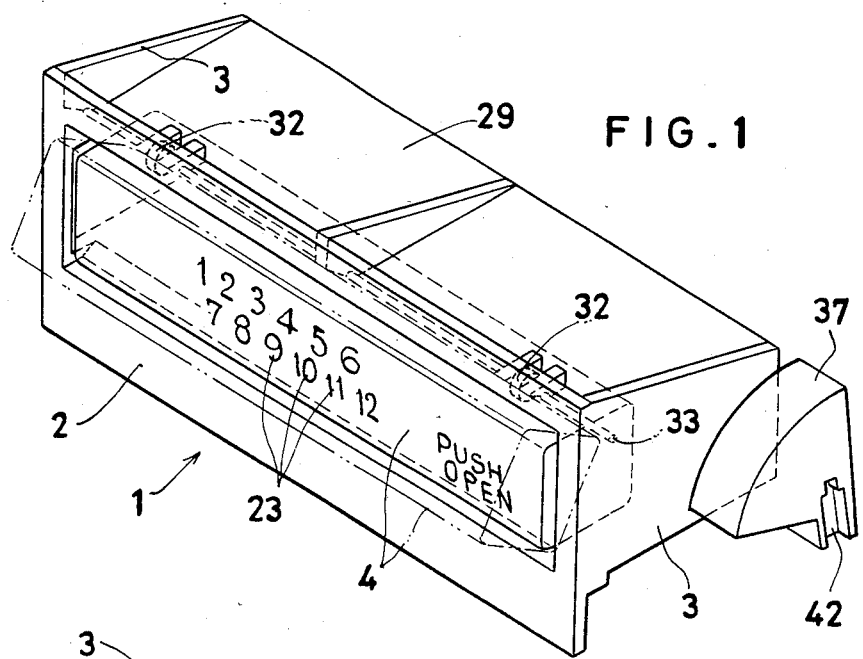
FIG. 1 is a perspective view of an embodiment of the housing device for a control unit according to the present invention.
Figure 3:
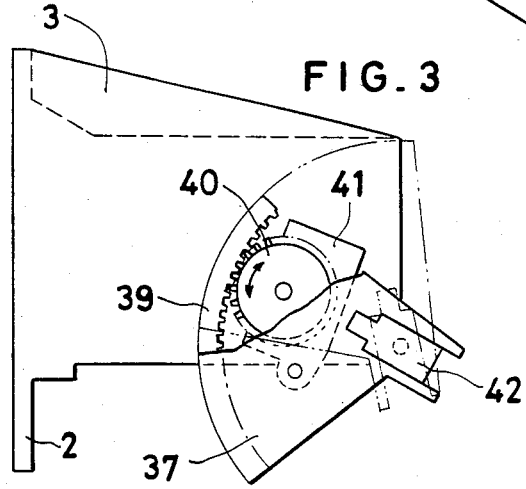
FIG. 3 is a partially cutaway side view of one portion of the housing device shown in FIG. 1.
Figure 5:
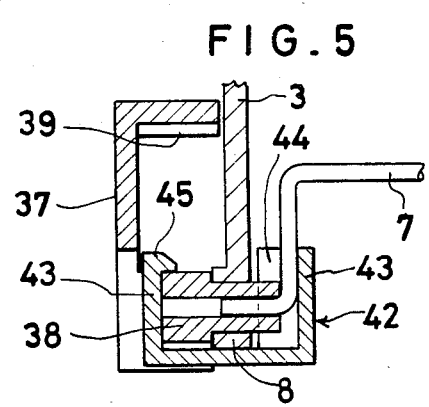
FIG. 5 is a sectional view showing an equalizer and an internal gear attached by means of a clip.
Figure 2:
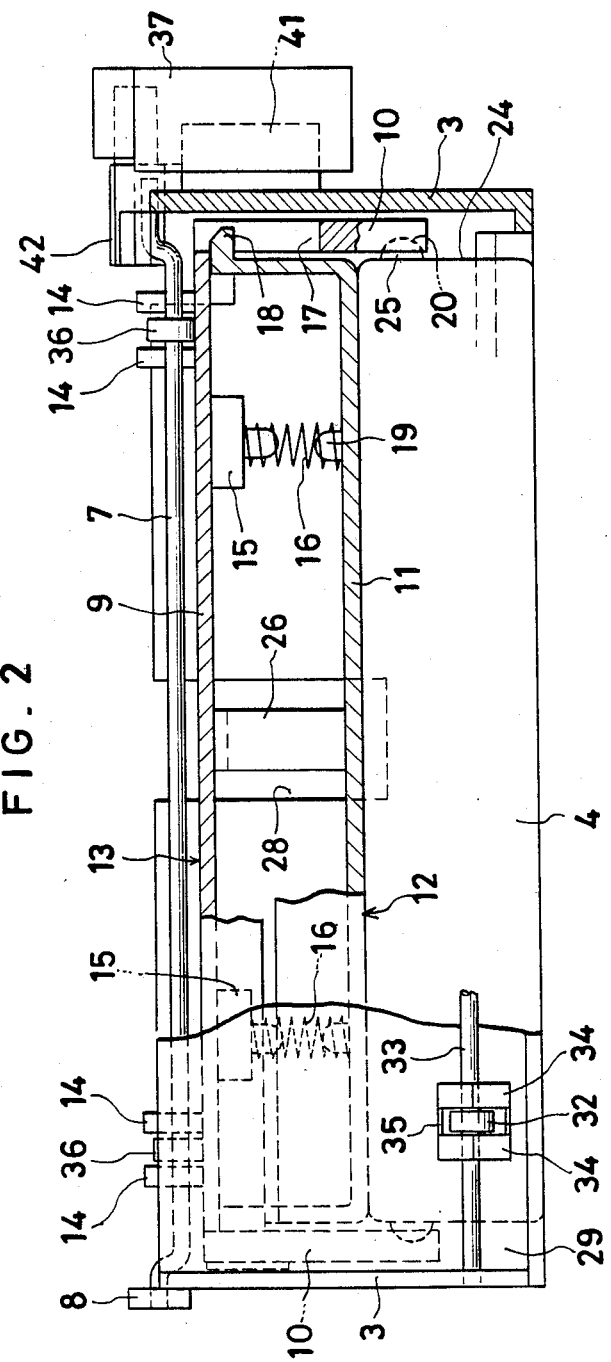
FIG. 2 is a partially cutaway plan view of the housing device shown in FIG. 1.
Figure 4:
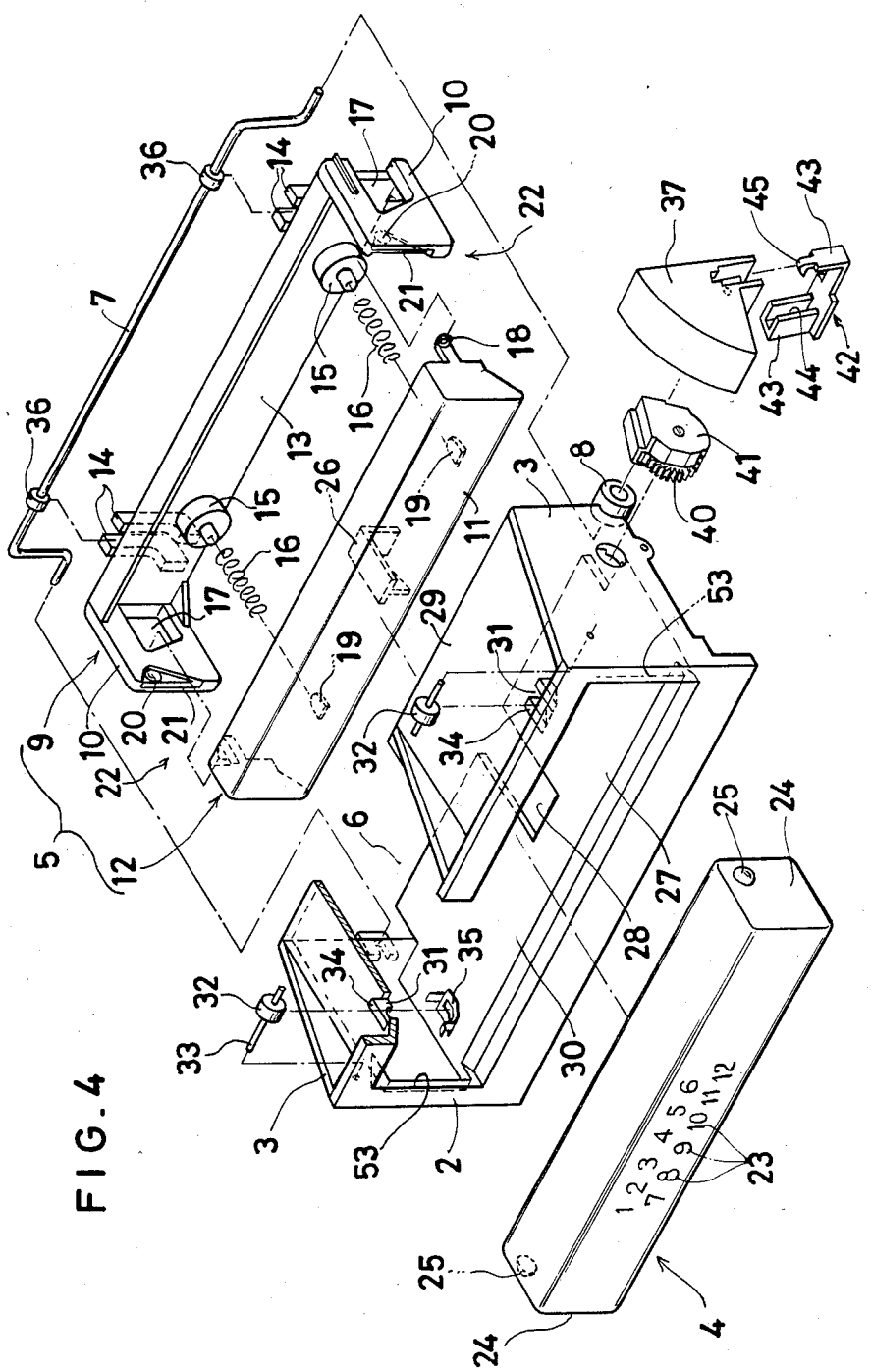
FIG. 4 is an exploded perspective view of the housing device shown in FIG. 1.
Figure 6:
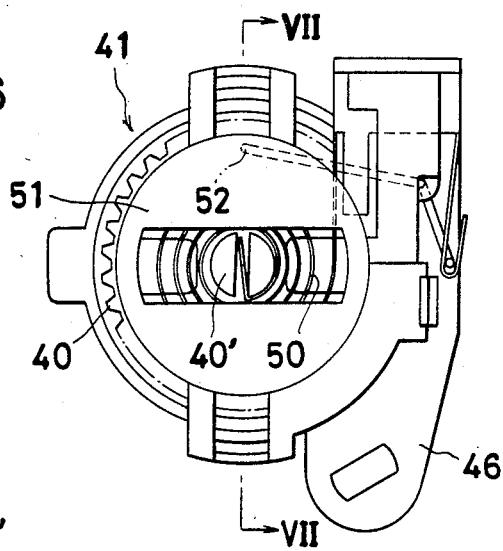
FIG. 6 is a front view of an example of a rotary damper with stopper mechanism.
Figure 7:
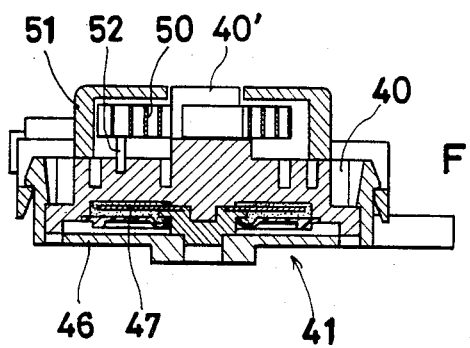
FIG. 7 is a sectional view taken along line VII—VII in FIG. 6.
Figure 8:
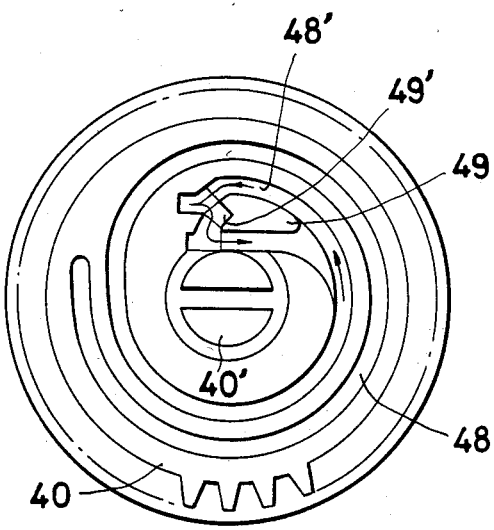
FIG. 8 is a plan view of the gear of the damper shown in FIG. 6.
Figure 9:
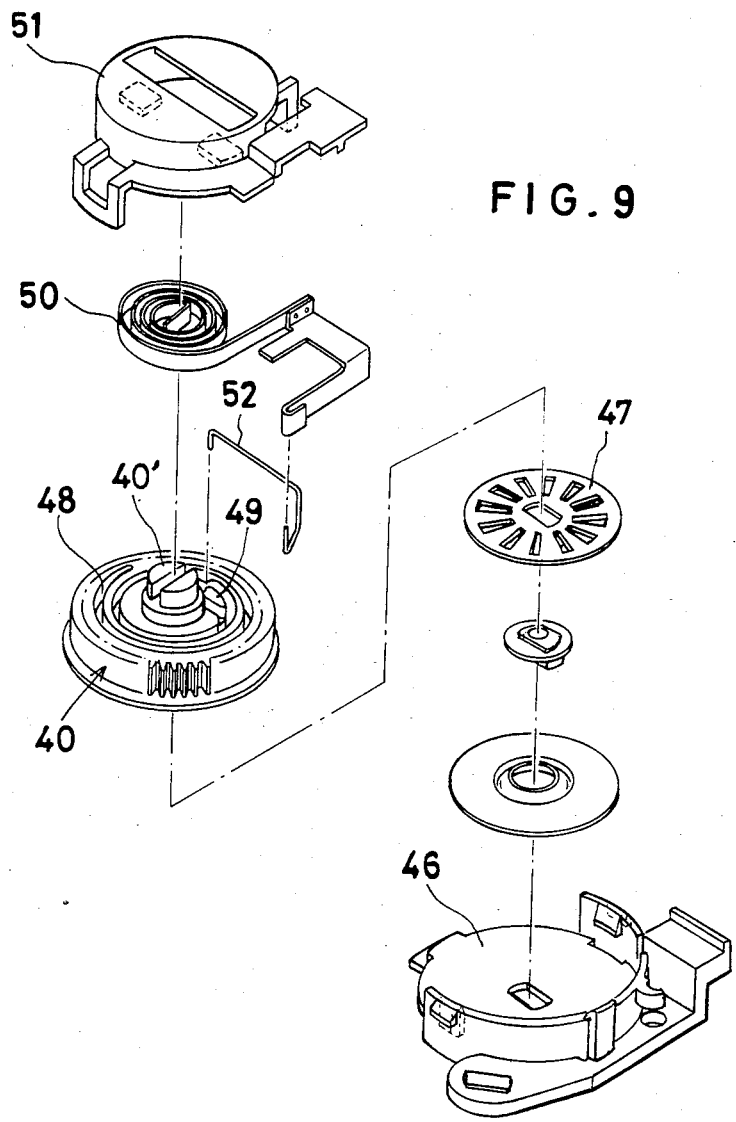
FIG. 9 is an exploded perspective view of the damper shown in FIG. 6.

Referring to the drawings, the numeral 1 denotes a housing device for accommodating a TV or VCR remote control unit in accordance with one embodiment of the present invention. The housing device 1 has an outer case 2 between the side walls 3,3 of which is supported a slide member 5 so as to be slidable inwardly and outwardly of the outer case 2. The slide member 5 is adapted to retain a control unit 4 in the front portion thereof in such manner that the control unit 4 can be inserted therein and removed therefrom as desired. The outer case 2 is open at the front and back, and the interior thereof is an empty space constituting a housing chamber 6. At the rear end of the side walls 3,3 are provided a pair of bearings 8,8 for an equalizer 7. The slide member 5 is inserted into the housing chamber 6 of the outer case 2 and a cover member 12, the front wall 11 of which doubles as a cover, is rotatably supported between the opposite side walls 10 of a U-shaped guide frame 9. At symmetrical positions on the left and right of the rear side of the rear wall 13 of the guide frame 9 are provided two pairs of equally spaced, upwardly opening L-shaped retainers 14 for supporting the equalizer 7. On the front side of the rear wall 13 are provided a pair of spring seats 15,15, one on the left and one on the right, which support a pair of springs 16,16.

Near the proximal end of each side wall 10 is provided a broad guide hole 17, the forward edge of which slants gradually inward from its upper end toward its lower end. A pair of projections 18,18 extending from the rear of the cover member 12 and projecting laterally outward are engaged with the guide holes 17 so that the cover member 12 is supported between the side walls 10,10 so as to be movable inwardly and outwardly and also to be rotatable about the projections 18,18. The outer ends of the springs 16,16 are fit over a pair of bosses 19,19 provided on the left and right on the rear face of the cover member 12 so that the cover member 12 is constantly urged in the direction of the distal end of the side walls 10,10 by the springs 16,16.

Each of the opposite side walls 10,10 of the guide frame 9 is provided on the inner side of its distal end with a hemispherical recess 20 and at the periphery of the recess 20 with a guide groove 21 which, though generally shallow, grows somewhat deeper in the downward direction. The recesses 20,20 and the guide grooves 21,21 together form retainers 22,22 for securing the control unit 4.

The control unit 4 in this embodiment is shaped like a bar and is used and housed in the housing unit with its longer axis lying horizontally. The control unit 4 contains a transmitting device and has pushbutton operating switches 23 on its front surface for channel selection, volume control and on/off control of the electric power. At the upper part of its lateral end faces the control unit 4 is provided with hemispherical projections 25,25. These hemispherical projections 25,25 are designed to engage with the hemispherical recesses 20,20 of the retainers 22,22 when the control unit is housed in the housing device 1, in such manner that the control unit is supported between the side walls 10,10 so as to be rotatable about the projections 25,25.

A downwardly facing L-shaped stopper 26 is provided to project rearwardly from the rear surface of the cover member 12. This stopper 26 limits the forward (outward) movement of the cover member 12 by striking against the forward edge of a notch 28 provided in the floor 27 of the outer case 2.

The forward end of the ceiling 29 of the outer case 2 inclines upwardly toward the open front face 30 of the case, and at the upper edge of this inclined portion are rotatably supported right and left guide rollers 32,32 which project partially into the housing chamber 6 through slots 31,31 provided in the ceiling 29. The guide rollers 32,32 are loosely fit on a long axle 33 which is retained at two points along its length by insertion into right and left axle supports 34,34, and is resiliently retained by upward pressure from a pair of roller supports 35,35, while the opposite ends of the axle 33 are rotatably supported by the side walls 3,3 of the outer case 2.

The equalizer 7 is a rod bent into the shape of a crank and has a pair of rollers 36,36 loosely fit thereon at symmetrical positions with respect to the longitudinal center thereof. The rollers 36,36 are fit one between each pair of retainers 14 on the guide frame 9 so as to abut against the rear face of the rear wall 13 of the guide frame 9, and the opposite ends of the equalizer 7 are fit into the bearings 8,8 on the outer case 2. One bearing 8 is given an inner diameter that is larger than the outer diameter of the end of the equalizer 7 and into the space between this bearing 8 and the equalizer 7 is inserted a cylindrical bearing 38 which itself is provided to extend laterally at the center of rotation of an internal gear 37. The internal gear 37 has an inwardly facing sector gear 39 whose center coincides with the center of the bearing 38 and on the outside of the side wall 3 of the outer case 2 is fixed a rotary damper 41 with stopper mechanism whose gear 40 meshes with the teeth of the sector gear 39.

The internal gear 37 and the equalizer 7 are unitarily fixed together by a clip 42. The clip 42 is a U-shaped body having a pair of opposed arms 43,43. One arm 43 has an inwardly facing groove 44 for receiving the bent portion of the equalizer 7 and the other arm 43 is formed at its tip with an inwardly facing claw 45 for engagement with one side of the internal gear 37. The groove 44 is fit onto the equalizer 7 and the claw 45 is engaged with one side of the internal gear 37 so as to integrally join the equalizer 7 and the internal gear 37 so that they rotate together. In the joined state the equalizer 7 abuts against the rear side of the rear wall 13 of the guide frame 9 at a prescribed angle.

The rotary damper 41 referred to above is of the type previously proposed by the inventor (Japanese Patent Public Disclosure SHO 59-193503, U.S. Ser. No. 598,534). The invention is of course not limited to the use of this particular rotary damper and any other type of damper may be used instead insofar as it is capable of providing the same functions. More specifically, it is sufficient to employ any type of damper which brakes (damps) the forward and reverse rotation of the gear 40 by the viscous resistance of silicon oil or the like, accumulates restoring force in a spring, as for example by winding a coil spring, when the gear 40 rotates in one direction, locks the gear 40 against reverse rotation by means of a lock mechanism employing a heart cam or the like when it reaches the end of its rotation in one direction, unlocks the gear 40 once locked against reverse rotation when the gear 40 is rotated slightly in one direction, and uses the restoring force stored in the spring to rotate the gear 40 in the opposite direction while at the same time damping this rotation.

The rotary damper disclosed in the applications mentioned above is illustrated in FIGS. 6-9. The operation of this rotary damper with stopper mechanism as it relates to the present invention is outlined below. For further details, see the prior applications mentioned above.

The gear 40 rotates on a mount 46. The underside of the gear 40 is formed with a depression into which there is inserted a damper plate 47 that remains stationary with respect to the mount 46. Silicon grease is applied to the undersurface of the gear 40 and the surface of the damper plate opposed thereto so as to damp the rotation of the gear 40 in both directions.

The upper face of the gear 40 is formed with a spiral groove 48 having at its inner end a one-way passage 48' which passes around a heart-shaped island 49, and with a boss 40' standing at the center thereof for fixing the inner end of a coil spring 50. A cover 51 designed for assembly with the mount 46 is set in place on top of the gear 40, with a portion of the periphery of the gear 40 being left exposed through the cover 51 so as to be able to mesh with the sector gear 39. To the cover 51 is attached a resilient stop pin 52 which is bent downward at its ends so as to intrude into the spiral groove 48. The coil spring 50 has its outer end fixed to the cover 51 and is accommodated in the cover 51 on top of the stop pin 52. The rotary damper 41 is attached to the inner surface of the side wall of the case 2 by means of the mount 46.

The outer case 2 housing the control unit 4 in the manner described in the foregoing can be easily assembled into the main body of a TV set or VCR (not shown) simply by providing an opening in the control panel on the front of the main body large enough to accommodate the rear portion of the outer case 2, fitting the rear portion of the outer case 2 into this opening, and fixing the outer case 2 to the main body with screws or the like.

Figure 10B:
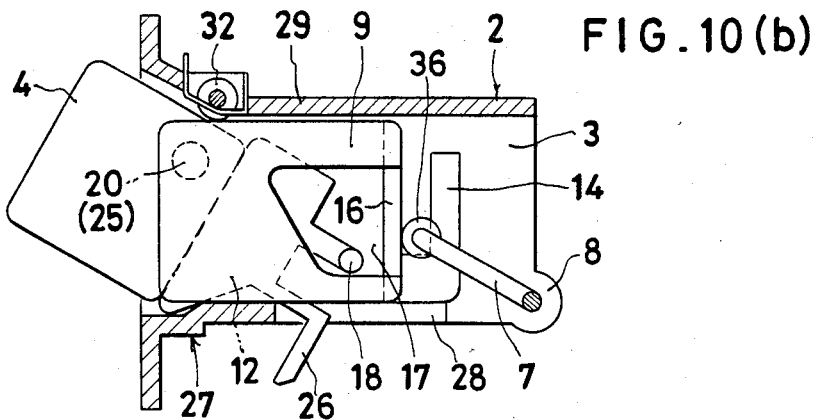
FIG. 10(b) is a sectional schematic view showing the control unit in the process of being pushed out of the housing device.
Figure 10C:
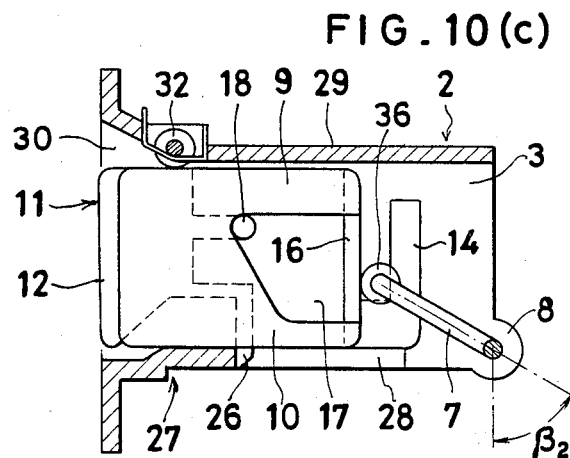
FIG. 10(c) is a sectional schematic view showing the housing device after the control unit has been removed therefrom.
Figure 10A:
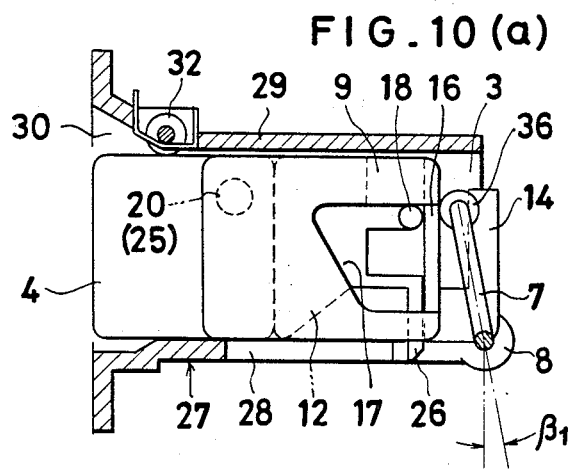
FIG. 10(a) is a sectional schematic view showing the control unit housed within the housing device.

When the control unit 4 once housed in the housing chamber 6 of the outer case 2 as shown in FIG. 10(a) is pressed slightly inward by pushing the finger against the front face thereof, it rotates upwardly as it is projected out from the open front face 30 of the case 2, making it easy for the user to remove. This action is realized as follows. The slight inward push of the control unit 4 causes the stop pin 52 to move out of a recess 49' in the island 49 of the rotary damper 41, whereafter the force stored in the coil spring 50 slowly rotates the gear 40 in the reverse direction under the damping action of the silicon grease, thus causing the sector gear 39 to rotate. The rotation of the sector gear 39 in turn causes the equalizer 7 to rotate downwardly so that the rollers 36,36 of the equalizer 7 press onto the rear wall 13 of the guide frame 9. The guide frame 9 is thus pushed by the rollers 36,36, and made to advance parallel to the walls defining the housing chamber 6 in the direction of the open front face 30 of the outer case 2, this movement continuing until brought to a stop by collision of the forward edges of the side walls 10,10 with stoppers 53,53 provided to project inwardly from the side walls 3,3 of the outer case 2. When the guide frame 9 advances, the cover member 12 supported thereon and the control unit 4 also advance in parallel therewith and when the control unit 4 begins to project slightly from the open front face 30 it is rotated upwardly about the projections 25,25. This is because the projections 25,25 are located on the upper part of the ends 24,24 of the control unit 4. More specifically, when the projections 25,25 of the control unit 4 are engaged with the recesses 20,20 of the guide frame 9, the springs 16,16 are in a compressed state between the guide frame 9 and the control unit 4 (with the cover member 12 intervening therebetween). Thus when the springs 16,16 uniformly apply pressure to the rear of the control unit 4 via the cover member 12, there arises a force component acting to rotate the control unit 4 upwardly. As a result, when the control unit 4 has been projected slightly from the open front face 30 and becomes free to rotate, the force of the springs 16,16 causes the cover member 12 to rotate about the projections 18 and push the control unit 4 upward. When the control unit 4 is pushed from below by the cover member 12 it rotates about the projections 25,25 to face upward. This rotation stops when the projections 18,18 of the cover member reach the position where they strike against the lower edge of the guide hole 17. (FIG. 10(b))

In this state the control unit 4 is projected from the open front face 30 sufficiently for the user to remove it by pulling it out gripped between his fingers. Once the control unit 4 has been removed, the cover member 12 moves forward while rotating back to its previous orientation under the force of the springs 16,16. This forward movement of the cover member 12 continues until the stopper 26 collides with the forward edge of the notch 28 in the floor 27 of the outer case 2 and the projections 18,18 come into abutment with the upper part of the forward edge of the guide holes 17,17. At this time the front wall of the cover member 12 substantially closes the opening in the open front face 30 of the outer case 2. (FIG. 10(c))

After removing the control unit 4 from the outer case 2, the user can remotely control the TV or VCR by directing the transmitter section (not shown) of the control unit 4 toward the receiver section (not shown) of the TV or VCR and operating the pushbutton switches 23.

Next, when the control unit 4 is to be stored in the outer case 2, it is oriented with its operating switches 23 facing forward (away from the TV or VCR) and its rear face is first pushed into the outer case 2 through the opening in the open front face 30 against the force of the springs 16,16 until the projections 25,25 of the control unit 4 engage with the recesses 20,20 on the guide frame 9. Thereafter it is sufficient to press against the front face of the control unit 4 so as to cause it to move inwardly to a position slightly beyond that at which it is fully accommodated in the housing chamber 6 of the outer case 2 and then to release the pressure. This action causes the stopper mechanism of the rotary damper 41 to retain the control unit 4 in the stored position within the outer case 2, in which position its front face substantially closes the opening in the open front face 30 of the outer case 2. Thus the control unit 4 again assumes the initial stored state shown in FIG. 10(a).

More specifically, when the control unit 4 is pushed inward, the guide frame 9 retracts together with the cover member 12. When the guide frame 9 retracts, the equalizer 7 in contact with the rear face of the rear wall 13 of the guide frame 9 is rotated upwardly causing the inner gear 37 to rotate together therewith. The gear 40 of the rotary damper 41 is thus rotated through its engagement with the sector gear 39, this rotation of course being damped by the silicon grease applied to the damper plate 47 and the undersurface of the gear 40. As a result, the coil spring 50 is wound from its inner end, while the stop pin 52 moves along the spiral groove 48 until finally entering the one-way passage 48' surrounding the island 49 near the end of the operation of storing the control unit 4 in the housing chamber 6. Then when the user removes his hand from the control unit 4 after having pushed it slightly beyond the position at which it is to be stored, the force stored in the coil spring 50 causes the gear 40 to rotate slightly in the reverse direction, whereby the control unit 4 comes to assume the proper position for storage within the housing chamber 6 of the outer case 2. At this time, the tip of the stop pin 52 becomes caught in the recess 49' in the island 49, preventing rotation of the gear 40.

As the operating switches 23 of the control unit 4 are positioned in the opening in the open front face 30 of the case 2 when the control unit 4 is in the stored state, it is also possible to operate the stored control unit 4 from the operating panel of the TV or VCR.

The forces acting when the control unit is pushed into the housing device according to this invention will now be explained with reference to FIG. 11.

Figure 11A:
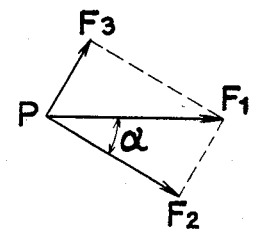
FIG. 11(a) is a diagram analyzing the forces acting when the control unit is pushed inward at the time it is accommodated within the housing device.
Figure 11B:
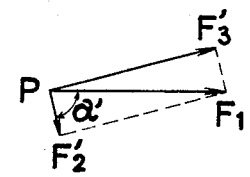
FIG. 11(b) is a diagram analyzing the forces acting when the control unit is pushed into the housing device for accommodation therein.

FIG. 11(a) shows an analysis of the forces acting when the control unit 4 once stored is pushed inward and corresponds to the state shown in FIG. 10(c), while FIG. 11(b) shows an analysis of the forces acting when the control unit 4 is pushed into the storage position and corresponds to the state shown in FIG. 10(a). Denoting the inward force exerted on the control unit 4 as $F_1$ (this force being assumed to be substantially constant), in the case of FIG. 11(a) the force $F_1$ will, at the point of contact P between the equalizer 7 and the rear face of the rear wall 13 of the guide plate 9, be equal to the sum of the force $F_2$ acting toward the center of rotation of the equalizer 7 and the force $F_3$ acting to rotate the equalizer 7, and in the case of FIG. 11(b) will be equal to the sum of the force $F_2'$ acting toward the center of rotation of the equalizer 7 and the force $F_3'$ acting to rotate the equalizer 7.

The forces $F_1$, $F_2$ and $F_3$ can be represented as follows:

$$F_1 = F_2 + F_3 \quad (1)$$

$$F_2 = F_1 \cos \alpha \quad (2)$$

$$F_3 = F_1 \sin \alpha \quad (3)$$

From which by substitution can be obtained:

$$F_1 = F_1 \cos \alpha + F_1 \sin \alpha = F_1(\cos \alpha + \sin \alpha) \quad (4)$$

Here, since $F_3$ is the force acting to wind up the spring coil 50, it is required that force $F_3$ be greater toward the end of the wind-up operation than at the beginning thereof.

As will be understood from the formula above, however, if the angle $\alpha$ is set so that $0° < \alpha < 90°$, the angle will grow gradually larger as the guide frame 9 retracts, and as the angle $\alpha$ grows larger, the force $F_2$ will grow gradually smaller and the force $F_3$ gradually larger. Therefore, since the force $F_3$ grows larger with the retraction of the guide frame 9, it will be sufficiently large to wind up the coil spring 50 over the whole range of the wind-up operation even when the force $F_1$ remains substantially constant.

As a consequence, in inserting the control unit 4 for storage, the user need only apply a constant force from the beginning to the end of the insertion operation and is thus able to carry out the insertion operation smoothly.

It should be noted that the angle $\alpha$ can be freely determined by selecting the angle of abutment $\beta$ of the equalizer 7 with the guide frame 9, the relationship between these two angles being $\beta = 90° - \alpha$. It is thus sufficient to set the abutment angle $\beta$ to satisfy the relationship $0° < \beta_1 < \beta_2 < 90°$, where $\beta_1$ and $\beta_2$ are the abutment angles when the guide frame is in the fully retracted position and the fully advanced position, respectively.

As is clear from the foregoing, in accordance with the present invention, since the equalizer acts uniformly over the full width of the rear of the slide member, the control unit is able to advance smoothly under the uniform pushing force applied to its right and left sides by the slide member, the slide member and the control unit are not subjected to any unnecessary friction within the outer case, and the amount of projection of the control unit is made equal on the right and left sides. Moreover, in the operation of inserting the control unit for storage, regardless of where pushing force is applied to the front face of the control member, the control unit will retract uniformly on the right and left sides, causing the slide member to rotate the equalizer until the lock mechanism of the rotary damper is brought into the securely locked state. Furthermore, as the housing unit can be fully assembled in advance, the amount of work required in mounting it in the TV or VCR can be greatly reduced.

Obviously, many modifications and variations of the present invention are possible in light of the above teachings. It is therefore to be understood that within the scope of the appended claims, the present invention may be practiced otherwise than as specifically described herein.

What is claimed is:

1. A housing device for a control unit comprising:
   an outer case having an opening at the front face thereof for insertion and removal of the control unit;
   a slide member which is accommodated within the outer case to be slidable inwardly and outwardly thereof and which releasably retains the control unit when it is inserted into the opening:
   a crank-shaped equalizer rotatably supported at its opposite ends on the opposite side walls of the outer case so as to abut against the rear of the slide member; and
   a rotary damper with stopper mechanism connected with one end of the equalizer, the stopper mechanism constantly retaining the slide member in its retracted position.

* * * * *